Oct. 30, 1956  A. H. LORD  2,769,097
THICKNESS MEASURING INSTRUMENT
Filed April 22, 1953
2 Sheets-Sheet 1

United States Patent Office 2,769,097
Patented Oct. 30, 1956

2,769,097

THICKNESS MEASURING INSTRUMENT

Arthur H. Lord, Houston, Tex., assignor to The Texas Company, New York, N. Y., a corporation of Delaware Application April 22, 1953, Serial No. 350,366

9 Claims. (Cl. 250—83.6)

This invention relates to the measuring of the thickness of walls or plates of steel or the like, and more particularly to a device for measuring the thickness of such an object from one side thereof by causing radiation to penetrate the object wherein some of the radiation is scattered and returned outwardly to a radiation detector. The output of the detector, when properly calibrated, will provide an indication of the thickness of the object since the magnitude (or intensity) of the detected scattered radiation will depend upon the thickness, i. e., the total mass of the material penetrated.

In the United States Letters Patent No. 2,536,131, granted January 2, 1951, to Gerhard Herzog, Arthur H. Lord, Leon M. Evans, and Robert B. Heath, an instrument is described for measuring the thickness of objects such as steel plates or walls in which radiation such as gamma rays from a source penetrates the plate and is scattered back to a detector in the vicinity of the source. The instrument described in the patent has proven to be very successful, and through its use measurements of the thickness of a steel plate less than three quarters of an inch in thickness can be measured to within an accuracy of a few thousandths of an inch. This measurement is made entirely from one side of the plate or wall, and no access is required to the other side. As disclosed in that patent, the instrument comprises essentially a portable "head" connected through a cable to an instrument case containing amplifiers, meters, and associated electronic equipment. As will be described more clearly hereinafter, the portable head of the device comprises a source of radiation such as gamma rays, a detector of scattered gamma rays, and a direct shield member in the form of a solid cone, these elements being disposed axially so that the base of the cone abuts against one end of the detector, and the radiation source is disposed at the apex of the cone. A block of radiation-absorbing material is disposed around the source for purposes of reducing the health hazard and to provide a degree of collimation for the radiation, and a layer of radiation-absorbing material is disposed around and in contact with the major portion of the detector, leaving an open space toward the side of the device which is to be placed near to or in contact with the wall or plate to be measured. Although, as stated above, the instrument has proven very effective in the measurement of thickness, it has been found that a reasonably large portion of the scattered radiation intercepted and detected by the detector does not come from within the wall or object being measured. The radiation reaching the detector consists in part of radiation which is scattered in the air, either inside or outside of the instrument housing, that which is scattered in the instrument housing itself, etc.

The instrument to be described herein is an improvement over that described in the aforementioned patent, and the principal purpose of the invention is to reduce to a minimum the scattered radiation reaching the detector from the air and objects other than the wall, the thickness of which is to be measured. The invention is concerned principally with improvements in the geometry of the instrument described in the above-mentioned Herzog et al. patent. As stated above, that instrument employs the principle of measuring back-scattered gamma ray photons resulting from the occurrence of the Compton effect in the material under inspection, and the interpretation of the intensity of the observed scattered quanta in terms of thickness of the material. The objects of the invention are accomplished through the use of certain radiation-absorbing shields so disposed as to absorb undesired radiation, either primary or scattered, which otherwise might be intercepted by the detector and also by reducing the size of the detector in proportion to the size of the base of the conical shield mentioned hereinbefore.

For a better understanding of the invention, reference may be had to the accompanying drawings in which Figure 1 is a somewhat diagrammatic view with certain parts in section of the portable instrument head disclosed and described in the aforementioned Herzog et al. patent;

Figure 1:
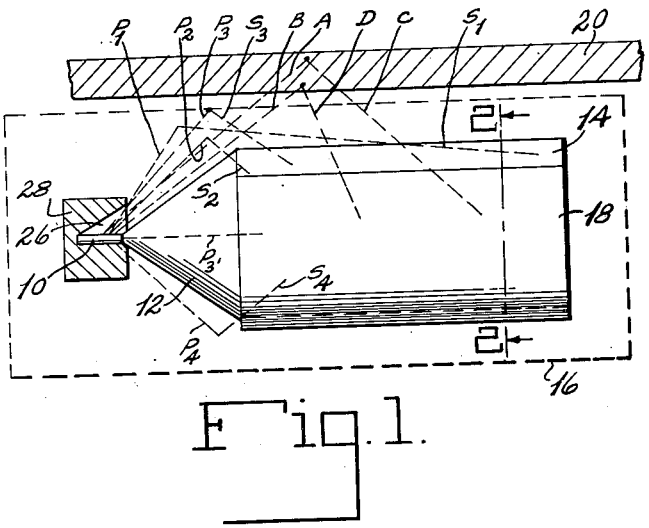

Referring to the drawing, Figure 1 represents the geometrical relationship of the gamma ray source, the primary absorber or shield, and the scattered gamma ray detector as disclosed in the aforementioned Herzog et al. Patent No. 2,536,131 and this figure is quite similar to Figure 2 of the drawing in that patent. The gamma ray source 10 which may be in the form of a needle or capsule of radium or an isotope such as radioactive cobalt is attached at the apex of a primary shield 12, which shield is in the form of a solid cone of a gamma ray absorbing material. Preferably, the material of the shield 12 is a metal with a high atomic number such as tungsten. A cylindrical gamma ray detector 14 of the same diameter as the base of the shield 12 is disposed with one end adjacent the base of that shield. While the detector 14 can be an ionization chamber, a Geiger-Mueller counter or the like, it is preferred that it be a high efficiency gamma ray detector of the multi-cathode plate type, such as is shown in the aforementioned U. S. Patent No. 2,536,131. A cylindrical case or housing 16 is shown diagrammatically by the dotted lines and surrounds the parts which have been described. It is understood that if desired a preamplifier for the output of the detector may also be enclosed within the housing 16 and its output passed through a suitable cable, not shown, to an amplifier, integration circuit and meter as is disclosed in the Herzog et al. patent.

Figure 2:
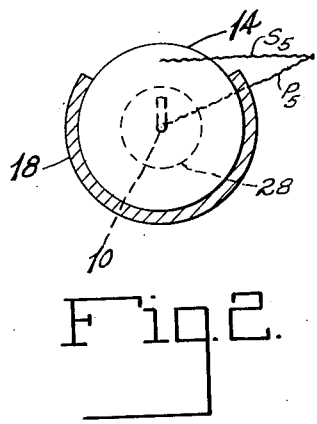
Figure 2 is a view on the line 2—2 of Figure 1 looking in the direction of the arrows.

As is shown more clearly in Figure 2, a layer of radiation shielding material 18 surrounds the major portion of the detector 14 throughout its length and serves to absorb some of the scattered radiation which may pass toward the detector from the instrument housing or from other objects such as a table on which the instrument may be resting, etc. As is shown in Figure 2, an open space of about 120° remains at the side of the detector toward the plate, wall, or other object 20, the thickness of which is to be measured. The instrument described so far is substantially the same as that disclosed in the aforementioned Herzog et al. patent. In Figure 6A is a typical calibration curve for this instrument with the wall thickness in inches plotted as the X-ordinate and the corresponding intensities of scattered gamma rays plotted as the Y-ordinate. It can be seen from this curve that the intensity observed with no material adjacent to the measuring head is quite high.

Two primary radiations or gamma rays are represented at A and B of Figure 1 as penetrating the wall of plate 20. These gamma rays, in colliding with atoms within the material of the wall produce secondary radiations C and D which are detected by the detector 14 as they emerge from the wall. As stated above, the detector 14 is shielded from extraneous secondary radiation from objects adjacent to the sides or back of the measuring head by means of the shielding layer 18.

Figure 6:
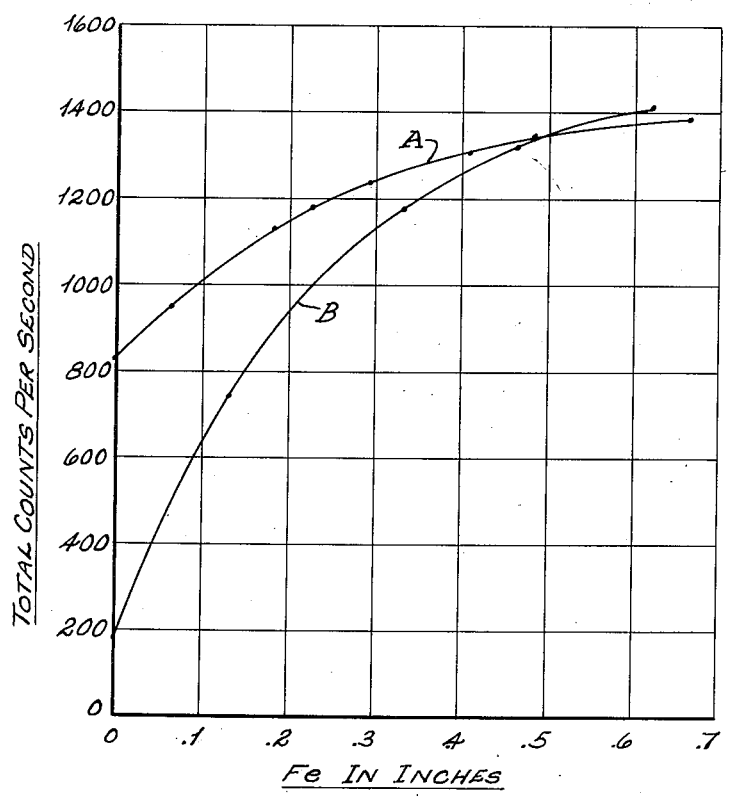
Figure 6 shows a pair of calibration curves showing a comparison between the efficiencies of the conventional and the improved instrument.

With reference to Figure 6, particularly to curve A, the counting rate plotted at zero wall thickness is called the air count, that is, the counting rate observed when no wall material is in position to be measured. Ideally, of course, the only count observed would be that due to the scattering in the air adjacent to the head. Actually, referring to Figure 1, this counting rate includes not only air scattering $P_1$—$S_1$ near the head but air scattering $P_2$—$S_2$ inside the housing 16, $P_3$—$S_3$ in the wall from the housing and unabsorbed primary radiation $P_3'$ from the source. The sum of these is termed the "air count," i. e., no-wall-thickness count, and constitutes the basic cause for substantial errors due to both instrument instability and increased statistical error. This is true since a large "air" count means a disproportionately small percentage of the total counting rate constituting the usable intensity, resulting in a disproportionate meter scale expansion. Also, statistical fluctuations are larger since calculation of statistical error must be based on total count. In order to correct this trouble, the changes in arrangement and geometry illustrated in Figures 3 and 4 have been incorporated in the instrument and form the basis of this invention.

Figure 3:
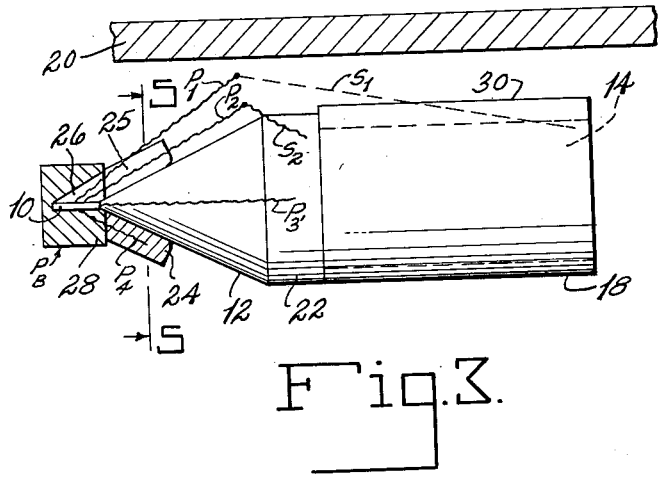
Figure 3 is a view similar to Figure 1 but of the improved instrument showing the absorbing effects of the added shielding.
Figure 5:
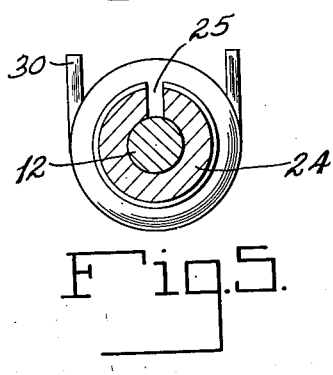
Figure 5 is a view on the line 5—5 of Figure 3 looking in the direction of the arrows.

With reference to Figure 3, it will be seen that the detector 14 is smaller in diameter than the diameter of the base of the cone shield 12. Therefore, the wide angle air scattering $S_1$ almost entirely misses the sensitive volume of the detector 14 and the sharp angle air scattering $S_2$ (Figure 1), in order to reach the sensitive volume of the detector, must first penetrate a greater thickness of the primary absorber 12. The conical shield 12 is now provided with a rod-like extension 22 of the same diameter as the base of the shield 12. It will be seen therefore that the primary gamma rays $P_3'$. in order to reach the sensitive volume of the detector, must travel a considerably longer path through the cone 12 and the extension 22. They are therefore much more likely to be absorbed in the material of these shield members before they reach the detector. This effect is further amplified by making the cone 12 as shown in Figure 3 longer than it was in the conventional form shown in Figure 1. In Figure 3 it will be seen that the air scattered radiation $S_2$ which struck the detector in Figure 1 is now absorbed in the extension 22. Other scattered radiation which has been greatly reduced is the scattering from the blind, or back, side of the head as illustrated by $P_4$—$S_4$ in Figure 1. This has been effected by the addition of a close-fitting tungsten alloy sleeve 24 around the smaller end of the cone 12. As shown in Figure 5, this sleeve is slotted on the sensitive or measuring side of the head, this slot 25 being aligned with the slot 26 shown within the source shield 28. As will be seen in Figure 3, the gamma ray $P_4$ has been absorbed within the sleeve 24 and therefore cannot produce the scattering $S_4$ indicated in Figure 1.

Figure 4:
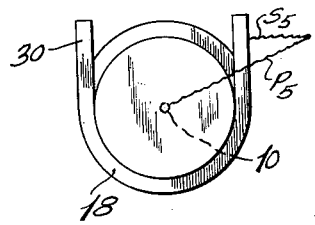
Figure 4 is a view similar to Figure 2 but showing the improved shield around the detector.

Still another source of unwanted "air count" scattering is illustrated in Figure 2 by the scattering path $P_5$—$S_5$. Due to the large scattering angle involved, these scattered quanta are extremely soft, i. e., of low energy, and can therefore be eliminated by extending the shield layer 18 as is indicated in Figure 4. Thus, the shield member 18 as shown in Figure 4 is now in the shape of a U and the side projections or legs 30 serve to absorb the scattered radiation $S_5$ as is indicated in Figure 4.

In Figure 6 curve B shows the calibration for an instrument having the improvements shown in Figures 3 and 4. It will be observed that the air count has been reduced to 180 counts per second as compared with an air count of 825 counts per second for the conventional measuring head shown in Figure 1. It is thus apparent from observing curve B that the usable range of the instrument has been increased very greatly.

Obviously, many other modifications and variations of the invention, as hereinbefore set forth, may be made without departing from the spirit and scope thereof, but only such limitations should be imposed as are indicated in the appended claims.

I claim:

1. In a device for determining a characteristic of an object from one side thereof, said device having a cylindrical detector of penetrative radiation, a solid conical shield member disposed axially of and with its base toward one end of the detector, and a source of radiation disposed at the apex of the conical shield, the arrangement being that radiation emitted from the source penetrates said object and is scattered back to be intercepted by the detector, means for confining said intercepted radiation to that which is scattered from within said object comprising a mass of radiation-absorbing material substantially surrounding said source and the small end portion of said conical shield, said mass being provided with a collimating slot directed toward the object to be examined.

2. A device as described in claim 1 in which the radiation-confining means also includes a rod-like extension of said first shield member and disposed axially between the base of said conical shield and one end of the detector.

3. A device as described in claim 1 in which said radiation-confining means also includes a U-shaped layer of radiation-absorbing material substantially surrounding said detector throughout its length and with its two leg portions directed toward the object to be examined.

4. A device as described in claim 1 in which the diameter of the detector is less than the diameter of the base of the conical shield member.

5. A device as described in claim 2 in which the rod-like extension is of the same diameter as the base of the conical shield member and the detector is of smaller diameter than said extension.

6. A device for determining the thickness of a wall from one side thereof by measuring the intensity of penetrative radiation scattered within the material of said wall, comprising a solid conical shield of radiation absorbing material, a source of penetrative radiation disposed at the apex of said shield, an extension of said shield projecting axially from the base of the shield, said extension having a diameter substantially the same as said shield base, an elongated detector of penetrative radiation of smaller diameter and projecting axially from the outer end of said extension, and a U-shaped shield member of radiation-absorbing material partially surrounding said detector at the side opposite the wall to be measured, the arrangement being such that radiation from said source passes into the wall to be measured, some of the radiation being scattered within the wall and passing to the detector, radiation from the source passing directly toward the detector being absorbed in said conical shield and its extension and radiation scattered from material other than said wall being absorbed in said U-shaped shield.

7. A device as described in claim 6 in which the curved portion of said U-shaped shield fits snugly around the detector throughout its length, the two straight leg portions of the U-shaped member projecting perpendicularly toward one side surface of the wall to be measured.

8. A device as described in claim 6 in which a layer of radiation-absorbing material substantially surrounds the end of said conical shield, the justaposed edges of said layer being slightly spaced apart to provide a collimating slot directed toward the side of the wall to be measured.

9. A device for determining the thickness of a wall by measuring the intensity of penetrative radiation scattered within the material of said wall comprising a solid conical shield of radiation-absorbing material, a source of gamma radiation disposed at the apex of said shield, a rod-like extension of said shield of uniform diameter equal to the base of said cone projecting axially from the base of the conical shield, a cylindrical gamma ray detector of smaller diameter and projecting from the outer end of said extension, and a U-shaped shield member of radiation-absorbing material enclosing the major portion of said detector throughout its length, the arrangement being such that gamma rays from said source pass into the wall to be measured where some are scattered within the wall and pass to the detector, radiation from the source passing directly toward the detector being absorbed in said conical shield and its extension and radiation scattered from material other than said wall being absorbed in said U-shaped shield.

References Cited in the file of this patent

UNITED STATES PATENTS

| | | |
|---|---|---|
| 2,277,756 | Hare | Mar. 31, 1942 |
| 2,536,131 | Herzog et al. | Jan. 2, 1951 |